(12) United States Patent
Ecke et al.

(10) Patent No.: US 12,518,914 B2
(45) Date of Patent: Jan. 6, 2026

(54) COIL ASSEMBLY

(71) Applicant: MICRO-EPSILON MESSTECHNIK GMBH & CO. KG, Ortenburg (DE)

(72) Inventors: Christian Ecke, Deggendorf (DE); Stefan Stelzl, Ortenburg (DE); Axel Seikowsky, Ortenburg (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 278 days.

(21) Appl. No.: 17/798,687

(22) PCT Filed: Dec. 20, 2021

(86) PCT No.: PCT/DE2021/200269
§ 371 (c)(1),
(2) Date: Aug. 10, 2022

(87) PCT Pub. No.: WO2022/135638
PCT Pub. Date: Jun. 30, 2022

(65) Prior Publication Data
US 2024/0312698 A1 Sep. 19, 2024

(30) Foreign Application Priority Data

Dec. 23, 2020 (DE) .......................... 102020216539.4

(51) Int. Cl.
*H01F 27/32* (2006.01)
*G01N 27/90* (2021.01)

(52) U.S. Cl.
CPC ....... *H01F 27/325* (2013.01); *G01N 27/9006* (2013.01)

(58) Field of Classification Search
CPC .............................. H01F 27/008; H01F 27/325
See application file for complete search history.

(56) References Cited

U.S. PATENT DOCUMENTS 4,180,717 A * 12/1979 Lenk .................. D02J 13/00
                                                336/197
4,532,398 A *  7/1985 Henriksson ........... H05B 6/104
                                                219/676
(Continued)

FOREIGN PATENT DOCUMENTS

CN        205280658         6/2016
CN      109038961 A        12/2018
(Continued)

OTHER PUBLICATIONS

Werner Reinhard: "Storungstolerantes Sensorsystem zur Zustandsüberwachung rotodynamischer Pumpen", Vom Fachbereich 18—Elektrotechnik und Informationstechnik der Technischen Universitat Darmstadt zur Erlangung der Wurde Eines Doktor-Ingenieurs (Dr.-Ing. ) Genehmigte Dissertation, Technische Univers, Sep. 16, 2011 (Sep. 16, 2011), pp. I-IV, 83, XP002691344, retrieved from the Internet: URL: http://tuprints.ulb.tu-darmstadt.de/2760/1/Berichtveroeffentlicht.pdf.
(Continued)

*Primary Examiner* — Shawki S Ismail
(74) *Attorney, Agent, or Firm* — FisherBroyles, LLP; Jason P. Mueller

(57) ABSTRACT

With regard to safe and long-term use of a coil arrangement with structurally simple means, a coil arrangement (1), in particular for use as an inductor, and in an embodiment for inductive sensors and eddy current sensors, with a winding body (3) and at least one coil wound on the winding body (3). or windable coil (2), is designed and developed in such a way that the winding body (3) has at least one resilient or elastic element (8, 8') and/or at least one resilient or elastic region for at least partial compensation of different thermal expansions and/or contractions of the winding body (3) and the coil (2).

3 Claims, 2 Drawing Sheets

(56) References Cited

U.S. PATENT DOCUMENTS

| | | | | |
|---|---|---|---|---|
| 5,493,217 | A | * | 2/1996 | Stahl ............... G01P 1/026 324/262 |
| 6,114,849 | A | * | 9/2000 | Price ............... G01N 27/9006 336/200 |
| 6,469,604 | B1 | * | 10/2002 | Palkovich ............... H01F 5/02 335/216 |
| 7,514,828 | B2 | * | 4/2009 | Vollmuth ............... H02K 3/38 310/71 |
| 7,539,549 | B1 | | 5/2009 | Discenzo |
| 8,034,045 | B1 | * | 10/2011 | Lyons ............... A61M 25/005 604/524 |
| 8,556,619 | B2 | * | 10/2013 | Matsen ............... B29C 33/302 72/342.92 |
| 2007/0267925 | A1 | | 11/2007 | Dooley |
| 2019/0131043 | A1 | * | 5/2019 | Bauer ............... H01F 27/2871 |
| 2020/0041571 | A1 | | 2/2020 | Propp |

FOREIGN PATENT DOCUMENTS

| | | |
|---|---|---|
| DE | 1071836 | 6/1960 |
| DE | 2110242 | 9/1972 |
| DE | 2118084 | 10/1972 |
| DE | 2527254 | 12/1976 |
| DE | 10011266 | 9/2001 |
| DE | 10216846 | 11/2003 |
| DE | 102015105188 A1 | 10/2016 |
| DE | 102015207861 | 11/2016 |
| DE | 102011077457 A1 | 9/2017 |
| DE | 102016213755 | 2/2018 |
| DE | 102017200014 A1 | 7/2018 |
| DE | 102017122238 A1 | 3/2019 |
| DE | 102019201409 A1 | 8/2019 |
| DE | 102019201412 A1 | 8/2019 |
| DE | 102018211838 A1 | 1/2020 |
| DE | 102018211850 A1 | 1/2020 |
| EP | 1796246 A1 | 6/2007 |
| GB | 2485446 A | 5/2012 |
| JP | 2014082267 | 5/2014 |
| RU | 2548678 C2 | 4/2015 |
| RU | 2569214 C2 | 11/2015 |
| WO | 2016044426 A1 | 3/2016 |
| WO | 2020249167 A1 | 12/2020 |

OTHER PUBLICATIONS

International Preliminary Report on Patentability issued in App. No. PCT/DE2021/200269, dated Jun. 13, 2023, 10 pages.

* cited by examiner

COIL ASSEMBLY

CROSS-REFERENCE TO RELATED APPLICATIONS

This application is a national stage entry application under 35 U.S.C. 371 of PCT Patent Application No. PCT/DE2021/200269, filed on 20 Dec. 2021, which claims priority to German Patent Application No. 10 2020 216 539.4, filed on 23 Dec. 2020, the entire contents of each of which are incorporated herein by reference.

FIELD

The present disclosure relates to a coil arrangement, in particular for use as an inductor, for example in an embodiment for inductive sensors and eddy current sensors, with a winding body and at least one coil that is or can be wound onto the winding body.

BACKGROUND

Coil arrangements of the type mentioned are known from practice and exist in different embodiments and sizes. For example, coil arrangements are used in eddy current sensors or inductive sensors. Eddy current sensors or inductive sensors contain a coil with one or more turns as part of the measuring system. The number of windings, wire diameter, geometry and dimensional stability over the service life in the region of application are of great importance for precise measuring systems. Coil body's serve as carriers of this coil, which hold the coil in measuring heads in the intended position.

Other coils are used as inductors in many areas of electrical engineering. The most important property is their inductance, which also depends on the diameter of the coil, among other things. In order for the coil to have a defined diameter, it is permanently wound onto a coil body as a winding body or, as an air core coil, is wound onto a winding mandrel as a winding body during manufacture.

These coil bodies are made from materials such as polyetheretherketone, PEEK, ceramic or other non-conductive materials. It is of secondary importance whether the coil body is injection molded or machined from solid material. Enamelled copper wire is usually used as the material for coils, but other metals such as silver can also be used.

A coil for the sensors described above is usually wound onto the coil body under room conditions and the copper wire/enamelled wire-system used is prehardened or pre-strengthened. In this state, the resulting winding package fits snugly against the coil body.

All coil bodies have the disadvantage that the coefficient of thermal expansion of the material used for the coil body differs from the coefficient of thermal expansion of the coil material or the winding package. As a result, when the temperature of the environment changes, for example in a measuring head, the coil body expands differently from the coil or the winding package and the corresponding geometries change.

When the maximum or minimum operating temperature is reached for the first time, the component expands or stretches or contracts or deforms-coil/winding package or coil body/winding mandrel—the other component with the higher thermal expansion coefficient—coil body/winding mandrel or coil/winding package. At the temperature maximum or minimum, the components reach a state of equilibrium. When the room conditions subsequently prevail again, the coil/winding package and coil body/winding mandrel partially, in some cases even completely, separate from each other. If, for example, the coil body expands more than the coil when the temperature increases, an extremely high force acts on the inside of the coil. As a result, the coil can be irreversibly stretched or the coil wire can even tear off. When the temperature drops again, the coil body shrinks again, but the coil remains stretched and thus loses contact with the coil body. The stability of the coil, for example under shock and vibration, is no longer given. The coil body could also fall off the coil body. The expansion also changes the diameter of the coil and thus its inductance. In any case, stable and reproducible measurements would no longer be possible. A similar effect is caused by a drop in temperature if the coil body shrinks more than the coil.

This means that the coil body deforms the coil mechanically—no longer elastically. This ultimately leads to permanent deformation of the coil, which has a significant impact on the measurement result or functionality.

In order to avoid detaching the coil from the coil body, sensors are cast with grout/adhesives. However, this leads to further temperature errors if the adhesion of the coil body or adhesives or grout breaks up.

When using a sensor under stress cycles—e.g. temperature, vibration, shock—this leads to a falsification of a measurement result due to a change in the coil position or impedance of the sensor, to a reduction in the shock/vibration resistance and to a poor reproducibility of measurement results on the temperature changes or even to the complete failure of the sensor.

The problem occurs in a completely analogous manner when coils are wound that are used as air core coils. Such coils are not permanently wound on a coil body, but are fixed at the installation site by other means, e.g., grouting or gluing. Air core coils are usually wound onto a winding mandrel using baked enamel wire. In order to mechanically fix the coil wire, the baked enamel wire is heated, which melts the baked enamel and fixes the coil wire after cooling. The resulting winding body is thus firmly baked and can be pulled off the winding mandrel. Here, too, different temperature expansions can occur between the winding mandrel and the coil or the winding package during caking, with the risk of damage to the coil or the winding package.

It is necessary to find a solution for the future in which the coil or the winding package without additional adhesive/grout is held force—neutrally on the coil body. In addition to avoiding damage to the coil/winding package, this would simplify the production and save material in the form of adhesive or grouting agent.

SUMMARY

The object of the present disclosure is thus to specify a coil arrangement of the type mentioned at the beginning, according to which safe and long-term use of the coil arrangement is made possible with structurally simple means.

Said object is achieved by a method including the features of claim 1. Accordingly, the coil arrangement is designed and developed in such a way that the winding body has at least one resilient or elastic element and/or at least one resilient or elastic region for at least partial compensation of different thermal expansions and/or contractions of the winding body and the coil.

According to the disclosure, it was initially recognized that the above object is achieved in a surprisingly simple manner by skillful design of the winding body. For this purpose, the winding body according to the disclosure has at least one resilient or elastic element and/or at least one resilient or elastic region. According to the disclosure, this at least one element and/or at least one region is designed in such a way that it is suitable to at least partially and preferably completely compensate for different thermal expansions and/or contractions or different thermal expansion coefficients of the winding body and the coil or a winding package having the coil. If a coil or a winding package tends to move away from the winding body to the outside, for example due to a greater thermal expansion of the coil or the winding package relative to the winding body, the at least one element or at least one region of this outward movement can virtually follow in an elastic or resilient manner, so that the coil or the winding package is prevented from becoming detached from the winding body. Forces leading to the separation of the coil or winding package from the winding body can therefore be at least partially compensated for by the at least one element or the at least one region, with damage to the coil or the winding package being largely or even completely prevented. In the same way, a thermally induced stronger contraction of the coil or the winding package relative to the winding body can be largely compensated for by the at least one element or the at least one region and its resilient or elastic properties. The at least one element or the at least one region can be moved in an inward direction by the contracting coil or by the contracting winding package. In any case, damage to the coil or a winding package can be largely prevented in the form of, e.g. a coil/enamel system. In the case of sensors with a coil arrangement according to the disclosure, falsifications of measurement results due to thermally damaged coil arrangements can be significantly reduced or even ruled out.

Consequently, with the coil arrangement according to the disclosure, a coil arrangement is provided, according to which safe and permanent use of the coil arrangement is made possible with structurally simple means.

In an exemplary embodiment of the coil arrangement according to the disclosure, the at least one element and/or the at least one region can extend essentially into an interior formed by the at least one coil or is arranged or formed essentially within this interior of the at least one coil. Elements or regions protruding into, or arranged or formed in this interior can particularly effectively compensate an expansion or contraction of a coil/winding package surrounding the interior, due to the fact that they are arranged virtually adjacent to the coil/winding package. Such an interior may have a circular shape or any other shape. For example, a coil body or a winding mandrel may be essentially circular-cylindrical.

In a structurally particularly simple manner, the at least one region can be formed by at least one slot in the winding body. With a clever arrangement of the slot, such a slot allows the surrounding material of the winding body to move elastically or resiliently in the direction of the slot to compensate for thermal expansion and/or contractions.

In an embodiment, the slot or slots can extend in a radial and/or axial direction of the winding body. By skillfully arranging and choosing the depth of the slot or slots in the axial direction, the extent of the possible elasticity or spring movement can be specified depending on the individual application. The deeper and longer a slot, the greater the extent of a possible compensating movement in the winding body. Such a slot usually extends in a straight line at the chosen position on the winding body.

Alternatively or in addition to such a slot, the at least one region can be formed by at least one circumferential groove in the winding body, wherein the groove can be arranged in the region of the at least one coil or adjoining the at least one coil. Ultimately, such a groove also forms a slot in the winding body, the groove being formed circumferentially, for example along a circumference of the winding body. Such a circumferential groove enables a particularly uniform and homogeneous compensatory movement of the winding body material.

With regard to a particularly simple configuration, the at least one element and/or the at least one region, in particular the at least one slot or the at least one groove, can be milled or cut into the winding body or produced by injection molding. The selected production method can be tailored to the individual application.

In an embodiment, the at least one element can be formed by at least one segment or at least one web. For example, in the case of an intersecting radial arrangement or formation of slots in a substantially circular winding body, a plurality of elements in the form of segments are formed in the winding body. If a groove is provided, which is formed circumferentially in the region of a coil, a circumferential web results as an element between the groove and the coil. Depending on the individual application and depending on the temperature differences to be expected when using the coil arrangement, the number and size of the regions and/or elements generated in the winding body can be selected individually.

In a further embodiment, the at least one region can be formed by a weakening of the material in the winding body. Such a weakening of the material can be realized, for example, by realizing differently compressible regions in the winding body. In this case, different materials can be used for the winding body, which are of different strengths and can be compressed with different amounts of force. Plastics or materials of different strength can be used for this purpose in order to form a winding body from different materials.

The winding body can be made in one piece or in several pieces, not only in connection with the application mentioned in the last paragraph. In other applications and constructions, too, it can be advantageous to form the winding body in one piece or in several pieces, depending on the individual requirement.

The coil arrangement according to the disclosure can be used in different areas of application. The winding body can have a coil body or a winding mandrel or be formed by a coil body or winding mandrel, with a winding mandrel usually being used to produce air core coils.

Further advantageous aspects and properties of exemplary embodiments of the coil arrangement according to the disclosure are explained below:

According to one exemplary embodiment, a one-part or multi-part winding body is used to hold a wound coil, in particular for inductive sensors or eddy current sensors, which is characterized by at least one resilient element of the winding body in the interior of the coil.

Due to the different temperature expansion coefficients of the winding body and the winding package/coil, the mechanical stresses that occur can lead to enormous forces in the event of temperature changes, which permanently damage the coil. In order to reduce these forces in the region of the coil or to dissipate them from the coil, the winding body is provided with one or more resilient elements and/or regions.

A winding body can be a coil body on which the coil is wound and which permanently supports the coil. However, a winding body can also be a winding mandrel, which is used in the manufacture of air core coils and only supports the coil during winding.

In a first embodiment, the winding body can be provided with one or more slots. The slot is designed in such a way that it partially cuts through the winding body in the region of the coil. The slot can be aligned radially and can extend axially into the winding body to a predeterminable or specific depth. An improvement is the use of two slots that are oriented at approximately 90° to each other and can intersect. However, more slots can also be used. The slots can be subsequently milled or cut into a formed winding body. As an alternative to this, the slot or slots can already be created in an injection molding tool, so that they are already formed during an injection molding process. The slots result in individual segments in the winding body, which form resilient elements in the radial direction. As a result, the forces acting on the coil due to the expansion of the winding body in the radial direction are reduced and absorbed by the resilient elements. The resilient properties of the segments can be adjusted by the number of slots and their depth, i.e., their extent in the axial direction. In this case, the elastic properties of the material of the winding body and the coil, as well as the maximum and/or minimum temperature expansion in the desired temperature range may be taken into account. By virtue of the so adapted resilient elements, the coil/winding package does not become irreversibly stretched. Rather, the coil is kept under non-critical tension so that it permanently maintains contact with the coil body.

In a further embodiment, the winding body can have a circumferential groove in the region of the coil. The material of the winding body is weakened in a targeted manner in the radial direction, as a result of which the winding body has a narrow web on the receptacle of the coil, which acts as a resilient element. The web must be dimensioned in such a way that the forces that occur on the coil when the temperature changes are within a range that prevents permanent damage.

It is also possible to combine the two configurations with one another. In this way, the forces in the radial direction can be distributed in a suitable manner over the segments and the web.

There are then various possibilities for advantageously designing and refining the teaching of the present disclosure. For this purpose, reference is made on the one hand to the subordinate claims and on the other hand to the following explanation of exemplary embodiments of the disclosure with reference to the drawing. In connection with the explanation of the exemplary embodiments of the disclosure with reference to the drawings, embodiments and refinements of the teachings are also explained in general.

DETAILED DESCRIPTION OF THE DISCLOSURE

Figure 1:
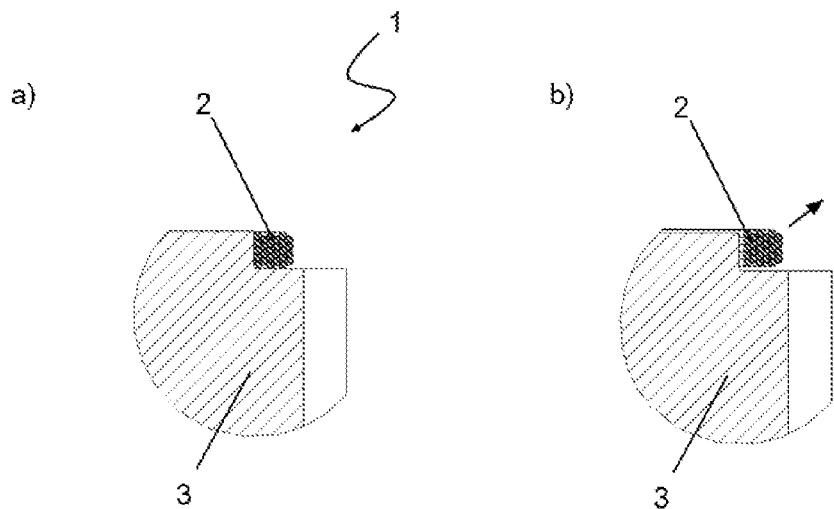
FIGS. 1a) and 1b) partially show, each in a sectional side view, a coil arrangement according to the prior art, FIG. 2 partially shows, in a sectional side view, an embodiment of the coil arrangement according to the disclosure, FIG. 3 partially shows, in a sectional side view, a further embodiment of the coil arrangement according to the disclosure, FIGS. 4a) and 4b) partially show, in a plan view and in a perspective view, a further embodiment of the coil arrangement according to the disclosure.

FIGS. 1a) and 1b) partially show, each in a sectional side view, a coil arrangement 1 according to the prior art. The coil arrangement 1 has a coil 2 on a winding body 3. The winding body 3 is made of a solid material, for example a plastic. The coil 2 is wound onto the winding body 3 at room temperature. Due to the wire tension during winding, the coil 2 forms a form-fitting winding package on the winding body 3. After one or more temperature cycles, in which due to different temperature expansion coefficients of the winding body 3 and coil 2, a relative expansion of the two components occurs and the coil 2 is stretched, the coil 2 can fall off the winding body or the bond with the winding body 3 can tear off. This is indicated in FIG. 1b) by an arrow.

Figure 2:
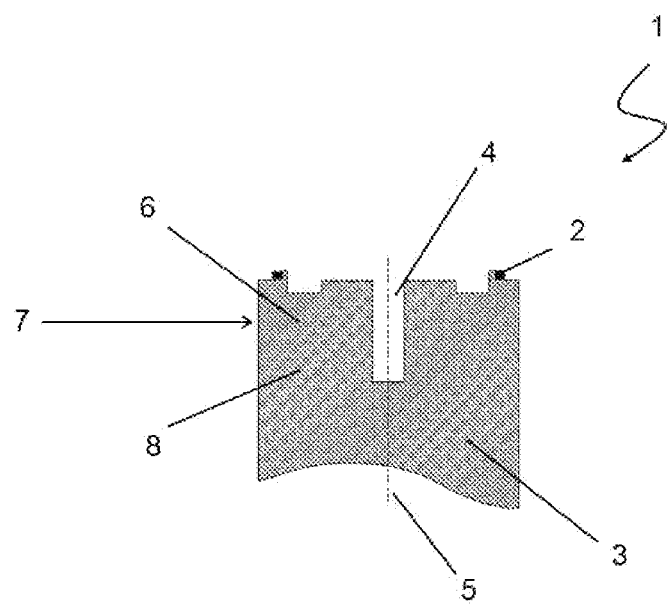

FIG. 2 shows a sectional side view of an exemplary embodiment of a coil arrangement 1 according to the disclosure with a winding body 3 with a slot 4 according to the disclosure in the winding body 3. The slot 4 is radial and runs through the winding body 3. The slot 4 extends centrally along the axis 5 of the winding body 3. Through the slot 4, segments 6 are formed in the winding body 3, which result in resilient elements 8 in the radial direction 7. When the temperature increases, the winding body 3 expands more than the coil 2. The segments 6 bend inwards due to the resilient elements 8. The depth of the slot 4 is designed in such a way that the maximum permissible force on the coil 2 is not exceeded for a given temperature range.

Figure 3:
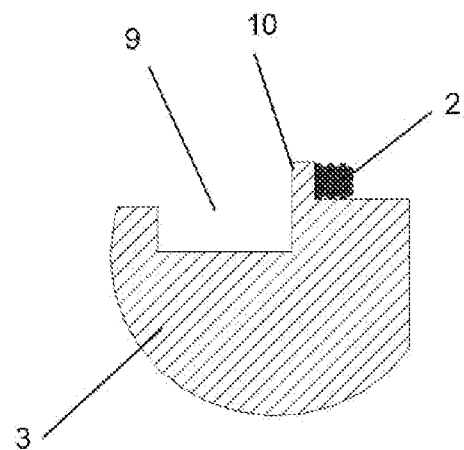

FIG. 3 partially shows, in a sectional view, another exemplary embodiment of a coil arrangement 1 according to the disclosure with a winding body 3 having a peripheral groove 9. The width of the groove 9 runs inside the coil 2 in the radial direction and in the circumferential direction around the winding body 3 and weakens, so to speak, the material inside the coil 2. Through the groove 9, a web 10 is formed in the winding body 3, which acts as a resilient element 8.

Figure 4:
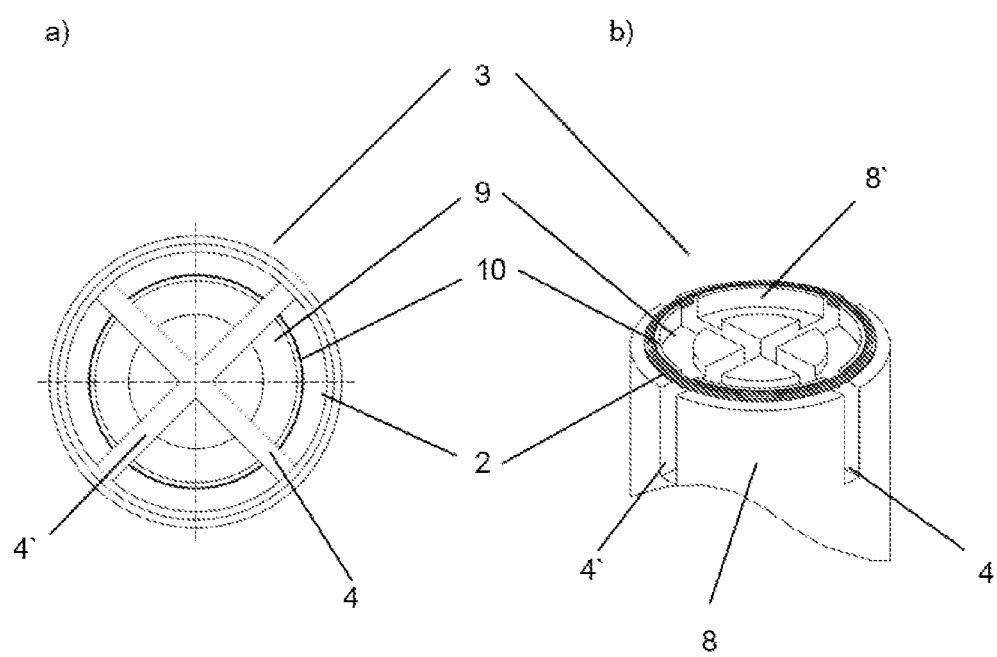

FIGS. 4a) and 4b) show a further exemplary embodiment of a coil arrangement 1 according to the disclosure, with FIG. 4a) showing a winding body 3 in a top view and FIG. 4b) partially showing the same in a perspective oblique view. The winding body 3 contains two slots 4, 4' crossed at 90°. In addition, a groove 9 is formed or milled in the winding body 3. This creates a combination of resilient elements 8, 8', consisting of the resilient elements 8 formed by the segments and the resilient elements 8' formed by the web 10, wherein the web 10 consists of four resilient elements 8' interrupted by the slots 4, 4', the resilient elements 8' being formed in the resilient members 8, respectively.

To avoid repetition with regard to further advantageous embodiments of the present disclosure, reference is made to the general part of the description and to the appended claims.

Finally, it is expressly noted that the above-described exemplary embodiments solely serve to explain the claimed teaching, but do not restrict the teaching to the exemplary embodiments.

LIST OF REFERENCE NUMERALS 1 coil arrangement
2 coil
3 winding body
4, 4' slot
5 axis
6 segment
7 radial direction
8, 8' element
9 groove
10 web

The invention claimed is:

1. A coil arrangement (1), for use as an inductor with inductive sensors and eddy current sensors, comprising:
  a circular-cylindrical winding body (3); and
  a coil (2) that is wound onto the winding body (3),
  wherein the winding body (3) is configured such that the winding body (3) has
    at least one resilient or elastic region for at least partial compensation of different thermal expansions and/or contractions of the winding body (3) and the coil (2),
  wherein the at least one resilient or elastic region is formed by at least one slot (4, 4") in the winding body (3) and by a circumferential groove (9) in the winding body (3),
  wherein the at least one slot (4, 4) extends in an axial direction of the winding body (3) into an interior formed by said coil (2) and through the winding body (3) along an axis (5) of the winding body (3),
  wherein by the at least one slot, segments (6) are formed in the winding body (3), which form resilient elements (8) in a radial direction (7), and
  wherein the groove (9) is formed inside the coil (2) with its width in the radial direction, whereby between the groove and the coil a circumferential web 10, interrupted by the at least one slot and consisting of resilient elements (8'), is formed.

2. The coil arrangement (1) of claim 1, wherein the at least one slot (4, 4') or the groove (9) is milled or cut into the winding body (3).

3. The coil arrangement (1) of claim 1, wherein the winding body (3) has a coil body or a winding mandrel.

* * * * *